US012774358B2

(12) United States Patent
De Patto et al.

(10) Patent No.: US 12,774,358 B2
(45) Date of Patent: Oct. 27, 2026

(54) COPOLYMERS COMPRISING (PER)FLUOROPOLYETHER CHAINS

(71) Applicant: SYENSQO SPECIALTY POLYMERS ITALY S.P.A., Bollate (IT)

(72) Inventors: Ugo De Patto, Cogliate (IT); Andrea Lotierzo, Brugherio (IT); Pier Antonio Guarda, Arese (IT)

(73) Assignee: SYENSQO SPECIALTY POLYMERS ITALY S.p.A., Bollate (IT)

( * ) Notice: Subject to any disclaimer, the term of this patent is extended or adjusted under 35 U.S.C. 154(b) by 24 days.

(21) Appl. No.: 18/575,990

(22) PCT Filed: Jun. 23, 2022

(86) PCT No.: PCT/EP2022/067109

§ 371 (c)(1), (2) Date: Jan. 2, 2024

(87) PCT Pub. No.: WO2023/274821

PCT Pub. Date: Jan. 5, 2023

(65) Prior Publication Data

US 2024/0368329 A1 Nov. 7, 2024

(30) Foreign Application Priority Data

Jul. 1, 2021 (EP) .................................... 21183081

(51) Int. Cl.

| | |
|---|---|
| ***C08F 293/00*** | (2006.01) |
| ***C08L 53/00*** | (2006.01) |
| ***C10M 107/38*** | (2006.01) |
| ***C10N 40/02*** | (2006.01) |
| ***C10N 40/06*** | (2006.01) |
| ***C10N 40/08*** | (2006.01) |
| ***C10N 40/14*** | (2006.01) |
| ***C10N 40/30*** | (2006.01) |

(52) U.S. Cl.

CPC .......... *C08F 293/00* (2013.01); *C08L 53/005* (2013.01); *C10M 107/38* (2013.01); *C08L 2205/025* (2013.01); *C10M 2213/0623* (2013.01); *C10N 2040/02* (2013.01); *C10N 2040/06* (2013.01); *C10N 2040/08* (2013.01); *C10N 2040/17* (2020.05); *C10N 2040/30* (2013.01)

(58) Field of Classification Search

CPC ........ C08F 283/06; C08F 293/00; C08F 8/22; C08L 2205/025; C08L 53/005; C10M 107/38; C10M 2213/043; C10M 2213/0623; C10N 2020/02; C10N 2020/04; C10N 2040/02; C10N 2040/06; C10N 2040/08; C10N 2040/17; C10N 2040/30

See application file for complete search history.

(56) References Cited

U.S. PATENT DOCUMENTS

| | | | | |
|---|---|---|---|---|
| 3,810,875 | A | 5/1974 | Hansen et al. | |
| 4,500,739 | A | 2/1985 | Caporiccio et al. | |
| 4,946,936 | A | 8/1990 | Moggi et al. | |
| 8,217,119 | B2 | 7/2012 | Abusleme et al. | |
| 8,258,090 | B2 | 9/2012 | Avataneo et al. | |
| 8,278,256 | B2 | 10/2012 | Marchionni et al. | |
| 2010/0105584 | A1* | 4/2010 | Avataneo | C08G 65/007 508/552 |
| 2011/0015107 | A1* | 1/2011 | Marchionni | C08G 65/3331 528/392 |
| 2020/0079902 | A1* | 3/2020 | Monzani | C08G 65/007 |

FOREIGN PATENT DOCUMENTS

| | | | |
|---|---|---|---|
| CN | 103724559 | B | 8/2016 |
| EP | 0089820 | B1 | 8/1987 |
| EP | 2100909 | A1 | 9/2009 |
| JP | 2001172343 | A | 6/2001 |
| JP | 5223435 | B2 | 6/2013 |
| WO | 2016150941 | A1 | 9/2016 |

OTHER PUBLICATIONS

Krukovsky S. P. et al., "New fluorine-containing oligomers and polymers", Journal of Fluorine Chemistry, Jun. 24, 1999, vol. 96, No. 1, pp. 31-33 (3 pages) (Year: 1999).*

International Search Report issued for corresponding international patent application No. PCT/EP2022/067109, mailed Sep. 30, 2022 (5 pages).

Written Opinion issued for corresponding international patent application No. PCT/EP2022/067109, mailed Sep. 30, 2022 (6 pages).

Krukovsky S. P. et al., "New fluorine-containing oligomers and polymers", Journal of Fluorine Chemistry, Jun. 24, 1999, vol. 96, No. 1, pp. 31-33 (3 pages).

Sianesi D. et al., "Perfluoropolyethers (PFPES) From Perfluoroolefin Photooxidation", Organofluorine Chemistry Principles and Commercial Appl, Jan. 1, 1994, pp. 431-461 (31 pages).

Standard ISO 6721—Plastics—Determination of dynamic mechanical properties—Part 10: Complex shear viscosity using a parallel-plate oscillatory rheometer—Sep. 15, 2015 (24 pages).

* cited by examiner

*Primary Examiner* — Latosha Hines

(74) *Attorney, Agent, or Firm* — Osha Bergman Watanabe & Burton LLP

(57) ABSTRACT

The present patent application relates to block copolymers comprising (per)fluoropolyether chains useful as lubricants and characterized by increased viscosity.

10 Claims, No Drawings

COPOLYMERS COMPRISING (PER)FLUOROPOLYETHER CHAINS

CROSS-REFERENCE TO RELATED PATENT APPLICATIONS

This application is a national stage entry under 35 U.S.C. § 371 of International Application No. PCT/EP2022/067109 filed on Jun. 23, 2022, which claims priority to European Application Nr. 21183081.5, filed on Jul. 1, 2021. The entire contents of these applications are explicitly incorporated herein by this reference.

TECHNICAL FIELD

The present patent application relates to copolymers comprising (per)fluoropolyether chains, characterized by increased viscosity.

BACKGROUND ART

Lubrication is an important aspect of maintaining machinery in proper operating condition. Machine elements such as bearings, pins, shafts, gears and joints require proper lubrication between their moving surfaces to decrease friction, prevent contamination, reduce wear and dissipate heat. Improper lubrication is likely to lead to premature component wear and component or system failure.

(Per)fluoropolyether polymers (in the following referred to as "PFPE polymers") have been long known as base oils or as additives in several lubricant applications.

Several syntheses of PFPE polymers have been disclosed in the art. The first synthesis of unspecified perfluorinated polyether mixtures was reported in 1953, when an oily product was obtained in the course of photo-oligomerization of hexafluoropropene. Since then, a number of different perfluorinated polyethers have been synthesized and described in literature.

U.S. Pat. No. 4,500,739 (in the name of Montedison) discloses the reaction of a peroxidic PFPE with—among the others—perfluoro butadiene (Group II of fluoroolefins). Example 4 discloses the reaction with perfluoro butadiene, with a large excess of perfluorinated bis-olefin, resulting in pendant unsaturated groups along the macromolecular chain such that the reaction can further proceed in the presence of hexamethylenediamine.

U.S. Pat. No. 8,258,090 B2 (in the name of Solvay Solexis S.p.A.) discloses fluorinated lubricants of formula:

$$T—O—[A—B]z—[A'—B']z'—A—T \quad (I)$$

wherein

T and T' are $C_{1-3}$ perfluoroalkyl or $C_{1-6}$ alkyl,

A and A are a perfluoropolyether chain,

B derives from two different olefins, of which at least one homopolymerizable by radical route, of formula:

$$—[(CR_1R_2—CR_3R_4)_j—(CR_5R_6—CR_7R_8)_{j'}]— \quad (Ia)$$

wherein j is from 1 to 5, j' is from 0 to 4 and the sum of j+j' is between 2 and 5;

$R_1$ to $R_3$ are halogen, H, $C_{1-6}$ (per)haloalkyl, $C_{1-6}$ alkyl, $C_{1-6}$ oxy(per)fluoroalkyl;

z is higher than or equal to 2, z' is an integer and the sum of z and z' is such that the number average molecular weight of the polymer of formula (I) is in the range 500-500000;

B' is (Ia) but at least one of R1 to R8 has a meaning different than that in B. This patent discloses block copolymers characterized by a linear backbone, in other words no branching is obtained from groups of formula B.

Polymers obtained using PFPE polymeric units have been disclosed in the art. Crossed-linked fluoroelastomers are among those. On this regard, S. P. Krukovsky et al.—J of Fluorine Chemistry 96 (1999) 31-33—disclosed copolymerization of perfluoroalkyleneoxides containing peroxide groups in the chain with perfluorodivinyl ethers under UV radiation and heating to provide cross-linked polymers, referred to as elastomers. This document does not disclose any amount for the reactants, and does not address a method for manufacturing polymers suitable for use for lubricants.

SUMMARY OF INVENTION

While research and development in the recent years focused on mono- and/or bi-functional (per)fluoropolyether (PFPE) polymers, the Applicant perceived that there is still the need for providing neutral PFPE polymers that can be used as lubricants.

The Applicant faced the problem of providing new neutral PFPE polymers characterized by an increased viscosity (as measured by complex viscosity at 0.1 rad/s at 25° C.), while maintaining low glass transition temperature (Tg) and still being in the liquid state at room temperature.

The Applicant surprisingly found that neutral branched (per)fluoropolyether polymers characterized by increased viscosity, due to an increase of the number average molecular weight, can be provided via a process easy to implement on industrial scale.

Advantageously, the process allows to manufacture neutral (per)fluoropolyether polymers having high thermal stability while maintaining a low glass transition temperature and increasing the viscosity index (ASTM D2270), such that such polymers are particularly useful as lubricants in harsh environments, including for example applications requiring wide range of working temperatures or high heat generation.

In a first aspect, the present invention relates to a block copolymer [copolymer (P)] having two chain ends, wherein both said chain ends comprise a perfluorinated alkyl group, and comprising a first and a second (per)fluoropolyether chain [PFPE chain] each having two chain ends, wherein the first chain end of said first and second PFPE chain comprises a perfluorinated alkyl group and the second chain end of said first and second PFPE chain are bonded to each other via a block of formula (I):

$$—[A—B]— \quad (I)$$

wherein (A) is a PFPE chain, and (B) is a moiety complying with the following formula (II):

(II)

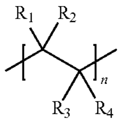

wherein n is an integer from 1 to 3;

$R_1$ to $R_4$, each independently, is selected in the group comprising, preferably consisting of, fluorine atom, perfluorinated linear or branched alkyl group having from 1 to 6 carbon atoms, group of formula (III):

$$—(R_{10})_t[C(R_{11})(R_{12})—C(R_{13})(R_{14})(R_{15})]_z \quad \text{(III)}$$

wherein $R_{10}$ is an oxygen atom, or a bi-/tri-/tetravalent perfluorinated alkyl chain comprising from 1 to 24 carbon atoms optionally interrupted by and/or comprising at least one oxygen atom, t is zero or 1, z is an integer from 1 to 3;

$R_{11}$ to $R_{15}$, each independently, is selected in the group comprising, preferably consisting of, fluorine atom, perfluorinated linear or branched alkyl group having from 1 to 6 carbon atoms and group of formula (IV):

$$—[(A^{\wedge})_a—(B^{\wedge})_v]—(C^{\wedge})—T \quad \text{(IV)}$$

wherein

A^ is a PFPE chain, a is zero or 1, v is zero or an integer from 1 to 3,

B^ is a group of formula $—[C(R^{1\wedge})(R^{2\wedge})—C(R^{3\wedge})(R^{4\wedge})]—$ wherein $R^{1\wedge}$ to $R^{4\wedge}$ each independently has the meaning defined above for $R_1$ to $R_4$, C^ is a PFPE chain, and T is a perfluorinated alkyl group;

wherein:

said A and B in formula (I) and said A^ and B^ in formula (IV) are statistically distributed, at least one of $R_1$ to $R_4$ is a group of formula (III), one of $R_{11}$ or $R_{12}$ and one of $R_{13}$ to $R_{15}$, is a group of formula (IV) wherein a is 1, and the sum of (B+B^) is from 1 to 15.

In a second aspect, the present invention relates to a process [process (P)] for the manufacture of copolymer (P) as defined above, said process comprising the steps of:

a) contacting at least one peroxidic (per)fluoropolyether polymer [PFPE peroxy] with at least one perfluorinated compound of formula (III-p):

(III-p)

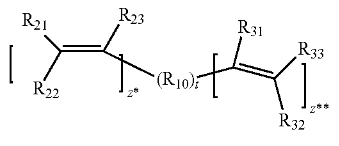

wherein each of $R_{21}$ to $R_{23}$ and $R_{31}$ to $R_{33}$ is independently fluorine atom, perfluorinated linear or branched alkyl group having from 1 to 6 carbon atoms, $R_{10}$ is an oxygen atom, a perfluorinated linear or branched alkyl group comprising from 1 to 24 carbon atoms, optionally interrupted by and/or comprising at least one oxygen atom, t is zero or 1, preferably 1;

each of z* and z** is independently 1 or 2;

wherein the amount of the compound of formula (III-p) is less than 5 wt. % of the amount of the PFPE peroxy;

b) letting the PFPE peroxy and the compound of formula (III) react in the presence of UV radiation or heating;

c) fluorinating, thus obtaining said copolymer (P).

In the process according to the present invention, it is important that the number of equivalents of unsaturated moieties of formula (III-p) is properly selected to be lower than the moles of peroxidic units in the PFPE peroxy, so that branched block copolymers (P) free from unsaturated moieties as pendant groups (also referred to as "functional groups") are obtained.

Copolymer (P) is advantageously free from pendant groups comprising any moiety capable of undergoing a further chemical reaction. In particular, copolymer (P) is free from unsaturated moieties as pendant groups.

In a third aspect, the present invention relates to copolymer (P) obtained via process (P) described above.

While purification steps can be performed after step (c), it will be clear to those skilled in the art that the copolymers (P) according to the present invention are obtained at the end of step (c) of process (P) as a mixture.

Thus, in a further aspect, the present invention relates to a mixture [mixture (P)] comprising two or more copolymers (P) as defined above.

It will be clear to those skilled in the art that mixture (P) is obtained via process (P) as described above.

Advantageously, said mixture (P) can be subjected to one or more purification steps (also referred to as "fractionation" steps), thus obtaining separate copolymers (P) characterized by different viscosities.

In a further aspect, the present invention relates to a method for lubricating at least one surface of at least one article, said method comprising contacting said copolymer (P) or said mixture (P) with said at least one surface.

DESCRIPTION OF EMBODIMENTS

For the purpose of the present description and of the following claims:

the use of parentheses around symbols or numbers identifying the formulae, for example in expressions like "polymer (P)", etc., has the mere purpose of better distinguishing the symbol or number from the rest of the text and, hence, said parenthesis can also be omitted;

the acronym "PFPE" stands for "(per)fluoropolyether" and, when used as substantive, is intended to mean either the singular or the plural form, depending on the context;

the term "(per)fluoropolyether" is intended to indicate a fully or partially fluorinated polyether polymer.

Preferably, in copolymer (P), the first PFPE chain, the second PFPE chain, A, A^, C^ are the same or different from each other.

Preferably, said perfluorinated alkyl groups are the same or different from each other.

Preferably, said perfluorinated alkyl group is a linear perfluoroalkyl group comprising from 1 to 3 carbon atoms.

Preferably, in copolymer (P), said at least one first PFPE chain is bonded to said at least one block of formula (I) via a sigma bond or a group selected from —$CF_2$—, —$CF_2CF_2$— or —O—.

Preferably, in copolymer (P), said second PFPE chain is bonded to said at least one block of formula (I) via a sigma bond or a group selected from —$CF_2$—, —$CF_2CF_2$— or —O—.

Preferably, in copolymer (P), (A) and (B) in formula (I) are linked via a sigma bond or a group selected from —O—, —$CF_2$— or —$CF_2CF_2$—.

Preferably, in copolymer (P), each of said first PFPE chain, second PFPE chain, A in formula (I) and said A^ and C^ in formula (IV) is a partially or fully fluorinated chain [chain ($R_f$)] comprising, preferably consists of, repeating units being independently selected from the group consisting of:

(Rf-i) —CFXO—, wherein X is F or $CF_3$;

(Rf-ii) —CFXCFXO—, wherein X, equal or different at each occurrence, is F or $CF_3$, with the proviso that at least one of X is —F;

(Rf-iii) —$CF_2CF_2CW_2O$—, wherein each of W, equal or different from each other, are F, Cl, H;

$$—CF_2CF_2CF_2CF_2O—; \quad \text{(Rf-iv)}$$

(Rf-v) —$(CF_2)_j$—CFZ—O— wherein j is an integer from 0 to 3 and Z is a group of general formula —O—$R_{(f-a)}$T, wherein $R_{(f-a)}$ is a fluoropolyoxyalkene chain comprising a number of repeating units from 0 to 10, said recurring units being chosen among the following: —CFXO—, —$CF_2CFXO$—, —$CF_2CF_2CF_2O$—, —$CF_2CF_2CF_2CF_2O$—, with each of X being independently F or $CF_3$ and T being a $C_1$-$C_3$ perfluoroalkyl group.

Preferably, said chain ($R_f$) complies with the following formula:

$$—[(CFX^1O)_{g1}(CFX^2CFX^3O)_{g2}(CF_2CF_2CF_2O)_{g3}(CF_2CF_2CF_2CF_2O)_{g4}]—$$

wherein $X^1$ is independently selected from —F and —$CF_3$, $X^2$, $X^3$, equal or different from each other and at each occurrence, are independently —F, —$CF_3$, with the proviso that at least one of X is —F;

g1, g2, g3, and g4, equal or different from each other, are independently integers ≥0, such that g1+g2+g3+g4 is in the range from 2 to 1000; should at least two of g1, g2, g3 and g4 be different from zero, the different recurring units are generally statistically distributed along the chain.

More preferably, chain ($R_f$) is selected from chains of formula:

$$—[(CF_2CF_2O)_{a1}(CF_2O)_{a2}]— \quad (R_f\text{-IIA})$$

wherein:

a1 and a2 are independently integers≥0 such that the number average molecular weight is between 1,000 and 100,000; both a1 and a2 are preferably different from zero, with the ratio a1/a2 being preferably comprised between 0.1 and 10;

$$—[(CF_2CF_2O)_{b1}(CF_2O)_{b2}(CF(CF_3)O)_{b3}(CF_2CF(CF_3)O)_{b4}]— \quad (R_f\text{-IIB})$$

wherein:

b1, b2, b3, b4, are independently integers≥0 such that the number average molecular weight is between 1,000 and 100,000; preferably b1 is 0, b2, b3, b4 are >0, with the ratio b4/(b2+b3) being ≥1;

$$—[(CF_2CF_2O)_{c1}(CF_2O)_{c2}(CF_2(CF_2)_{cw}CF_2O)_{c3}]— \quad (R_f\text{-IIC})$$

wherein:

cw=1 or 2;

c1, c2, and c3 are independently integers≥0 chosen so that the number average molecular weight is between 1,000 and 100,000; preferably c1, c2 and c3 are all >0, with the ratio c3/(c1+c2) being generally lower than 0.2.

Still more preferably, chain ($R_f$) complies with formula ($R_f$—III) here below:

$$—[(CF_2CF_2O)_{a1}(CF_2O)_{a2}]— \quad (R_f\text{-III})$$

wherein:

a1, and a2 are integers >0 such that the number average molecular weight is between 1,000 and 100,000 with the ratio a1/a2 being generally between 0.1 and 10, more preferably between 0.2 and 5.

Preferably, in formula (II), n is an integer equal to 1 or 2, more preferably 1.

Preferably, in formula (II), at least one of substituents $R_1$ to $R_4$ is a group of formula (III) and the other substituents are each independently selected from a fluorine atom or a perfluorinated alkyl chain having from 1 to 3 carbon atoms, more preferably a fluorine atom or a perfluorinated alkyl chain having 1 carbon atoms.

According to one embodiment, in formula (III), t is 0.

According to another embodiment, in formula (III), t is 1 and $R_{10}$ complies with one of the following formulae:

$$—(CF_2)_d(O)_e(CF_2O)_fR_{CF}(O)_{e*}(CF_2)_{d*}(CF2O)_{f*} \quad (R_{10}\text{-i})$$

wherein each of d, d*, e, e*, f and f* is independently zero or 1 and $R_{CF}$ is a perfluoroalkyl chain comprising from 1 to 12, preferably from 1 to 8 carbon atoms, optionally interrupted by one or more oxygen atoms $$—O—(C_3F_6O)_h—(CF_2)_i—(OC_3F_6)_j—O— \quad (R_{10}\text{-}ii)$$

wherein h=j and h+j is from 2 to 6, and i is from 2 to 6.

According to this embodiment, preferably $R_{10}$ complies with formula:

$$—(CF_2)_d(O)_e(CF_2O)_fR_{CF}(O)_{e*}(CF_2)_{d*}(CF2O)_{f*} \quad (R_{10}\text{-i})$$

wherein d, f, d* and f* are zero, e and e* are 1, and $R_{CF}$ is a linear perfluoroalkyl chain comprising from 1 to 10, preferably from 1 to 8 carbon atoms Preferably, in formula (III), z is equal to 1 and $R_{10}$ is an oxygen atom or a bivalent perfluorinated alkyl chain comprising from 1 to 24 carbon atoms, optionally interrupted by and/or comprising at least one oxygen atom.

Preferably, in formula (III), one of substituents $R_{11}$ and $R_{12}$ is a group of formula (IV) and the other substituent is selected from a fluorine atom or a perfluorinated alkyl chain having from 1 to 3 carbon atoms, more preferably a fluorine atom or a perfluorinated alkyl chain having 1 carbon atoms.

Preferably, in formula (III), one of substituents $R_{13}$ to $R_{15}$ is a group of formula (IV) and the other two substituents are independently selected from a fluorine atom or a perfluorinated alkyl chain having from 1 to 3 carbon atoms, more preferably a fluorine atom or a perfluorinated alkyl chain having 1 carbon atoms. More preferably said two substituents are the same and are a fluorine atom.

Preferably, in formula (IV), a is 1, v is 1 and B^ is a group of formula —[C($R^{1\wedge}$)($R^{2\wedge}$)—C($R^{3\wedge}$)($R^{4\wedge}$)]— wherein $R^{1\wedge}$ to $R^{4\wedge}$ each independently are the same as each of $R_1$ to $R_4$, respectively.

Preferably, copolymer (P) is characterized by a complex viscosity, measured at 0.1 rad/s and at 25° C., from 10 Pa*s to 5000 Pa*s.

According to the present invention, said copolymer (P) is obtained via process (P) as described above.

Before step (a), the PFPE peroxy can be subjected to partial reduction of the peroxid bonds, for example by chemical reduction or UV treatment or thermal treatment.

Preferably, said PFPE peroxy is a peroxidic (per)fluoropolyether polymer comprising a (per)fluoropolyether chain having two chain ends, each of said chain ends comprising a (per)fluorinated alkyl chain having from 1 to 3 carbon atoms, optionally containing one or more chlorine atoms or functional end groups selected from acyl fluoride, fluoroformate and ketones, said chain ends being bonded to opposite sides of said (per)fluoropolyether chain, said (per) fluoropolyether chain comprising, preferably consisting of, repeating units being independently selected from the group consisting of formulae (Rf-i) to (Rf-v) as above defined and having a peroxidic content (PO), defined as grams of active oxygen (Mw=16) in 100 g of PFPE peroxy between 0.1 and 4, preferably between 0.1 and 3.5.

Preferably, in said compound of formula (III-p), when t is 1, the two, three or four unsaturated moieties are bonded to the same or different atoms, preferably carbon atoms, belonging to $R_{10}$.

Preferably, said at least one compound of formula (III-p) complies with the following formula:

$$CF_2{=}CF(R_{10})_tCF{=}CF_2$$

wherein t is zero or 1, $R_{10}$ complies with one of the following formulae:

$$—(CF_2)_d(O)_e(CF_2O)_fR_{CF}(O)_{e*}(CF_2)_{d*}(CF2O)_{f*} \quad (R_{10}\text{-}i)$$

wherein each of d, d*, e, e*, f and f* is independently zero or 1 and $R_{CF}$ is a perfluoroalkyl chain comprising from 1 to 12, preferably from 1 to 8 carbon atoms, optionally interrupted by one or more oxygen atoms $$—O—(C_3F_6O)_h—(CF_2)_i—(OC_3F_6)_j—O— \quad (R_{10}\text{-}ii)$$

wherein h=j and h+j is from 2 to 6, and i is from 2 to 6.

Preferably, said compound of formula (III-p) is selected from the group comprising, more preferably consisting of:

$CF_2{=}CFCF{=}CF_2$ $CF_2{=}CFOCF—CF_2$ $CF_2{=}CFCF_2OCF_2CF{=}CF_2$ $CF_2{=}CFO—(CF_2)_3CF{=}CF_2$ $CF_2{=}CFCF_2O(CF_2)_3OCF_2—CF{=}CF_2$ $CF_2{=}CFCF_2CF{=}CF_2$ $CF_2{=}CF(CF_2)_2CF{=}CF_2$ $CF_2{=}CF(CF_2)_3CF{=}CF_2$ $CF_2{=}CF(CF_2)_4CF{=}CF_2$ $CF_2{=}CFOCF_2OCF{=}CF_2$ $CF_2{=}CFO(CF_2)_2OCF{=}CF_2$ $CF_2{=}CFO(CF_2)_3OCF{=}CF_2$ $CF_2{=}CFO(CF_2)_4OCF{=}CF_2$ $CF_2{=}CF(CF_2)_2OCF{=}CF_2$ $CF_2{=}CF(CF_2)_3OCF{=}CF_2$ $CF_2{=}CF(CF_2)_4OCF{=}CF_2$ $CF_2{=}CFCF_2O(CF_2)_2OCF_2O—CF{=}CF_2$ $CF_2{=}CFCF_2O(CF_2)_3OCF_2O—CF{=}CF_2$ $CF_2{=}CFCF_2O(CF_2)_4OCF_2OCF{=}CF_2$ $CF_2{=}CFCF_2O(CF_2)_6OCF_2CF{=}CF_2$ $CF_2{=}CFO—CF_2O—(CF_2)_2O—CF_2O—CF{=}CF_2$ $CF_2{=}CFO—CF_2O—(CF_2)_3O—CF_2O—CF{=}CF_2$ $CF_2{=}CFO—CF_2O—(CF_2)_4O—CF_2O—CF{=}CF_2$ $CF_2{=}CFO—(CF_2O)_6—CF{=}CF_2$ $CF_2{=}CFO—(CF_2CF_2O)_2—CF{=}CF_2$ $CF_2{=}CFO—(CF_2CF_2O)_2—CF_2OCF{=}CF_2$ $CF_2{=}CFO(C_3F_6O)_h—(CF_2)_i—(C_3F_6O)_j—OCF{=}CF_2$ wherein h and j are the same and their sum is from 2 to 6 and i is from 2 to 6.

According to a particularly preferred embodiment, said at least one compound of wherein formula (III-p) complies with the following formula:

$$CF_2{=}CF(R_{10})_tCF{=}CF_2$$

wherein t is 1 and $R_{10}$ complies with formula:

$$-(CF_2)_d(O)_e(CF_2O)_f R_{CF}(O)_{e^*}(CF_2)_{d^*}(CF2O)_{f^*} \quad (R_{10}\text{-i})$$

wherein d, f, d* and f* are zero, e and e* are 1, and $R_{CF}$ is a linear perfluoroalkyl chain comprising from 1 to 10, preferably from 1 to 8 carbon atoms.

Preferably, in step (a), the amount of the compound of formula (III-p) is less than 3 wt. %, even more preferably less than 1 wt. %, of the amount of the PFPE peroxy.

It will be easily understood by those skilled in the art, that as the reaction proceeds and copolymer (P) is obtained, the unsaturated moieties in compound of formula (III-p) become saturated moieties in copolymer (P), such that substituents $R_{21}$ to $R_{23}$ in formula (III-p) become substituents $R_1$ to $R_3$ in formula (III) of copolymer (P), substituent $R_{31}$ become any of substituents $R_{11}$ or $R_{12}$ in formula (III) and substituents $R_{32}$ and $R_{33}$ become any of substituents $R_{13}$ to $R_{15}$ in formula (III) of copolymer (P).

Step (a) and step (b) can be performed in the presence of a fluorinated solvent. Preferably said fluorinated solvent is selected in the group comprising: perfluorocarbons, hydrofluorocarbons, perfluoropolyethers, hydrofluoropolyethers.

Preferably, step (b) is performed in the presence of UV radiation for a time from 2 to 60 hours.

Preferably, step (b) is performed in the presence of UV radiation at a temperature from −60° C. to +60° C., more preferably from −20° C. to +40° C. and even more preferably from 0° C. to 30° C.

As an alternative, step (b) can be performed under thermal treatment, preferably by heating at a temperature from 100° C. to 250° C.

It will be clear to those skilled in the art that the polymer obtained at the end of step (b) has a peroxide content (PO) lower than 0.05, preferably lower than 0.001.

Preferably, said step (c) is performed by treating with fluorine in the presence of anhydrous nitrogen flow.

Preferably, said process (P) comprises after step (c), step (d) of removal of the solvent and/or step (e) of fractionation.

Said step (d) of removal of the solvent can be carried out by evaporation, for example by distillation under vacuum.

Said step (e) of fractionation can be performed via solvent extraction, using supercritical $CO_2$, hexafluoroxylene or hydrofluorocarbons as solvents, and mixtures thereof when the fractionation step is performed via precipitation fractionation. Supercritical $CO_2$ is preferred.

As explained above, purification steps can be performed after step © or step (d), it will be clear to those skilled in the art that the copolymers (P) according to the present invention are obtained at the end of step (c) or of step (d) of process (P) as mixture (P), wherein copolymers (P) characterized by different viscosities and/or molecular weight and/or substituents are present.

Copolymer (P) is advantageously used as lubricant, notably for application in harsh environments, for example subjected to a wide range of working temperatures.

Copolymer (P) or mixture (P) can be used as such, or in admixture with additive(s) known to the person skilled in the art of lubrication, so that a composition [composition (CL)] is obtained.

For example, composition (CL) can comprise other suitable lubricants as base oil, such base oil being selected in the group comprising partially fluorinated, fully fluorinated and hydrogenated base oils, provided that said base oil is capable of forming a solution with copolymer (P).

Non-limiting examples of fully fluorinated lubricant base oils are those identified as compounds (1)-(8) in EP 2100909 A (SOLVAY SOLEXIS S.p.A.).

For example, suitable additives are selected from thickening agents, antirust agents, antioxidants, thermal stabilizers, pour-point depressants, anti-wear agents, including those for high pressures, dispersants, tracers, dyestuffs, talc and inorganic fillers.

Examples of thickening agents are talc, silica, boron nitride, polyureas, alkali or alkali-earth metals terephthalates, calcium and lithium soaps and complexes thereof and PTFE (polytetrafluoroethylene); among them, PTFE is preferred.

Examples of dispersants are, for example, surfactants, preferably non-ionic surfactants, more preferably (per)fluoropolyether surfactants and (per)fluoroalkyl surfactants.

If required by the application, solvents can also be used.

Examples of solvents are fluorinated or partially fluorinated solvents, such as Galden® PFPEs, Novec® HFEs and other organic solvents like fluoro-alkane, fluoro-aromatic compound, fluoroalkyl ether, fluoroalkyl amine, fluoro-alcohol, ketone such as methyl-ethyl-ketone, alcohol such as isopropyl alcohol, ester such as butylacetate, hydrofluorocarbons, and the like.

The article that can benefit from the lubricant properties of copolymer (P), mixture (P) or composition (CL) according to the present invention is not particularly limited.

Said article preferably comprises at least one metal surface.

Examples of said article are pumps for use in oil and gas applications, such as electrical submersible pump and the like, rotary machines, such as steam turbines and gas turbines; electrical connectors; bearings of fan clutches or cooling fans; or heavy duty truck automatic clutches, more particularly bearings of said clutches.

Copolymer (P), mixture (P) or composition (CL) according to the present invention can be advantageously used as damper fluids in a damping device.

Thus, in a further aspect, the present invention relates to a method for counteract vibrations and/or shocks in a device, said method comprising providing an apparatus comprising a damper device, said damper device comprising at least one copolymer (P), mixture (P) or composition (CL) as defined above.

Should the disclosure of any patents, patent applications, and publications which are incorporated herein by reference conflict with the description of the present application to the extent that it may render a term unclear, the present description shall take precedence.

The invention will be now described in connection with the following examples, whose purpose is merely illustrative and not intended to limit the scope of the invention.

EXPERIMENTAL SECTION

Materials

Peroxidic perfluoropolyether oil having formula $$T-O-(CF_2CF_2O)_m(CF_2O)_n-(O)_h-T'$$

number average molecular weight (Mn)=48600 g/mol, m/n=1.0 and PO=1.65%

T, T' = $—CF_3$ (83%), $—C(=O)F$ (6%), $—CF_2C(=O)F$ (11%)

was obtained by Solvay Specialty Polymers Italy S.p.A.

Galden® HT200 were obtained by Solvay Specialty Polymers Italy S.p.A.

Perfluoro(bis vinyl ether) (PBVE) was obtained by Anles Ltd.

Hexafluorobenzene was obtained by Sigma Aldrich.

Methods

19F-NMR Spectroscopy:

Varian Mercury 200 MHz spectrometer working for the fluorine nucleus was used to obtain the structure, the number average molecular weight and the composition of the PFPE oils reported in the following examples. The $^{19}$F-NMR spectrum was obtained on pure samples using $CFCl_3$ as internal reference. Hexafluorobenzene was also used as solvent.

Determination of the Peroxidic Content (PO):

The peroxidic content (PO) is expressed as grams of peroxidic oxygen per 100 g of polymer. The analysis of the peroxide content was carried out by iodometric titration using a Mettler DL40 device equipped with platinum electrode. The sensitivity limit for the PO determination was 0.0002%.

Determination of the Complex Viscosity:

The complex viscosity was measured with frequency sweep tests using an MCR502 Anton-Paar rheometer with parallel plate geometry (25 mm diameter) according to ISO 6721 part 10.

Gel Permeation Chromatography (GPC):

The analysis was performed with Mixed CCD column with a Waters 410 refractometer detector using HFE7100 as eluent.

Example 1—Synthesis of Copolymer (P-1)

The reaction was performed using a 1000 mL cylindrical photochemical glass reactor equipped with a high-pressure mercury lamp (HANAU TQ150) enclosed in a quartz cylinder, a magnetic stirrer, a thermocouple and a condenser.

200.3 g of the starting peroxidic perfluoropolyether oil were charged in the photochemical reactor together with 1501 g of Galden® HT200 and 1.30 g of PBVE and stirred thoroughly to obtain a homogenous mixture. The reaction mixture was then cooled down to about 10° C. with an ice/water bath and nitrogen was purged into the system at a rate of 1.0 Nl/h. The UV lamp was switched on.

After 55 hours of irradiation, the lamp was switched off and the reaction mixture was transferred into a second glass reactor and fluorinated at 40° C. with 1.0 Nl/h of fluorine gas for a total of 24 hours in the presence of UV radiation. $^{19}$F-NMR analysis confirmed the complete fluorination of the product and the absence of $—CF_2COF$ and —COF terminals at the chain ends.

The obtained solution was distilled at 240° C. for 4 h in a round bottom flask equipped with a magnetic stirrer in order to remove the solvent.

The distillation was conducted first at atmospheric pressure, then under reduced pressure (0.1 mbar) until complete removal of the solvent.

163.6 g of copolymer (P-1) in the form of a clear viscous oil were obtained as residue, which was analyzed by iodometric titration to confirm the complete removal of the peroxide units.

$^{19}$F-NMR analysis confirmed the absence of residual peroxide. Polymer (P-1) had m/n=1.0 and T, T'=$—CF_3$.

Example 2—Synthesis of Comparative Polymer (C-1^) without PBVE

The same photochemical apparatus and peroxidic perfluoropolyether precursor as Example 1 were adopted for this comparative example.

199.9 g of the starting peroxidic perfluoropolyether oil were charged in the photochemical reactor together with 1502 g of Galden® HT200 and stirred thoroughly to obtain a homogenous mixture.

The synthesis then proceeded as described in Example 1. $^{19}$F-NMR analysis confirmed the complete fluorination of the product and the absence of $—CF_2COF$ and —COF terminals at the chain ends.

Distillation was also performed as described in Example 1.

172.4 g of comparative polymer (C-1^) were obtained in the form of a clear viscous oil were obtained as residue, which was analyzed by iodometric titration to confirm the complete removal of the peroxide units.

$^{19}$F-NMR analysis confirmed the absence of residual peroxide. Comparative copolymer (C-1^) had m/n=1.0 and T, T'=$—CF_3$.

TABLE 1

| | Mn g/mol | Mw g/mol | Mw/M | Complex viscosity (at 0.1 rad/s and 25° C.) | Viscosity index (ASTM D2270) |
|---|---|---|---|---|---|
| Copolymer (P-1) | 52100 | 323000 | 6.2 | 57.5 Pa*s | 559 $mm^2/s$ |
| Comparative polymer (C-1^) | 24000 | 63000 | 2.6 | 5.6 Pa*s | 380 $mm^2/s$ |

The increased molecular weight distribution and complex viscosity of copolymer (P-1) according to the present invention confirmed the chain extension with respect to the comparative polymer (C-1^).

The invention claimed is:

1. A block copolymer (P) having two chain ends, wherein both said chain ends comprise a perfluorinated alkyl group, and comprising a first and a second (per)fluoropolyether chain [PFPE chain] each having two chain ends, wherein the first chain end of said first and second PFPE chain comprises a perfluorinated alkyl group and the second chain end of said first and second PFPE chain are bonded to each other via a block of formula (I):

$$—[A—B]— \quad (I)$$

wherein (A) is a PFPE chain, and (B) is a moiety complying with the following formula (II):

(II)

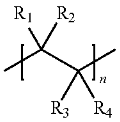

wherein n is an integer from 1 to 3;

$R_1$ to $R_4$, each independently, is selected from the group consisting of, fluorine atom, perfluorinated linear or branched alkyl group having from 1 to 6 carbon atoms, group of formula (III):

$$—(R_{10})_t[C(R_{11})(R_{12})—C(R_{13})(R_{14})(R_{15})]_z \quad (III)$$

wherein $R_{10}$ is an oxygen atom, or a bi-/tri-/tetravalent perfluorinated alkyl chain comprising from 1 to 24 carbon atoms, optionally interrupted by and/or comprising at least one oxygen atom, t is zero or 1, z is an integer from 1 to 3;

$R_{11}$ to $R_{15}$, each independently, is selected from the group consisting of, fluorine atom, perfluorinated linear or branched alkyl group having from 1 to 6 carbon atoms and group of formula (IV):

$$—[(A^{\wedge})_a—(B^{\wedge})_v]—(C^{\wedge})—T \quad (IV)$$

wherein

A^ is a PFPE chain, a is zero or 1, v is zero or an integer from 1 to 3,

B^ is a group of formula $—[C(R^{1\wedge})(R^{2\wedge})—C(R^{3\wedge})(R^{4\wedge})]—$ wherein $R^{1\wedge}$ to $R^{4\wedge}$ each independently has the meaning defined above for $R_1$ to $R_4$, C^ is a PFPE chain, and T is a perfluorinated alkyl group;

wherein:

said A and B in formula (I) and said A^ and B^ in formula (IV) are statistically distributed, at least one of $R_1$ to $R^4$ is a group of formula (III), one of $R_{11}$ or $R_{12}$ and one of $R_{13}$ to $R_{15}$, is a group of formula (IV) wherein a is 1, and the sum of (B+B^) is from 1 to 15;

wherein each of said first and second PFPE chain, A in formula (I) and said A^ and C^ in formula (IV) is independently a partially or fully fluorinated chain [chain (Rf)] comprising, repeating units being independently selected from the group consisting of:

(Rf-i) —CFXO—, wherein X is F or $CF_3$;

(Rf-ii) —CFXCFXO—, wherein X, equal or different at each occurrence, is F or $CF_3$, with the proviso that at least one of X is-F;

(Rf-iii) $—CF_2CF_2CW_2O—$, wherein each of W, equal or different from each other, are F, Cl, H;

(Rf-iv) $—CF_2CF_2CF_2CF_2O—$;

(Rf-v) $—(CF_2)_j—CFZ—O—$ wherein j is an integer from 0 to 3 and Z is a group of general formula $—O-R_{(f-a)}-T$, wherein $R_{(f-a)}$ is a fluoropolyoxyalkene chain comprising a number of repeating units from 0 to 10, said recurring units being selected from the group consisting of: —CFXO—, $—CF_2CFXO—$, $—CF_2CF_2CF_2O—$, and $—CF_2CF_2CF_2CF_2O—$, with each of X being independently F or $CF_3$ and T being a $C_1$-$C_3$ perfluoroalkyl group.

2. The block copolymer (P) according to claim 1, wherein said first and second PFPE chain, said A, A^, C^ are the same or different from each other; and/or each of said perfluorinated alkyl groups, being the same or different from each others, are a linear perfluoroalkyl group comprising from 1 to 3 carbon atoms; and/or said first PFPE chain is bonded to said at least one block of formula (I) via a sigma bond or a group selected from $—CF_2—$, $—CF_2CF_2—$ or —O—; and/or said second PFPE chain is bonded to said at least one block of formula (I) via a sigma bond or a group selected from $—CF_2—$, $—CF_2CF_2—$ or —O—;

said A and B in formula (I) are linked via a sigma bond or a group selected from $—CF_2—$ or $—CF_2CF_2—$.

3. The block copolymer (P) according to claim 1, wherein in formula (II):

n is an integer equal to 1 or 2; and/or at least one of substituents $R_1$ to $R_4$ is a group of formula (III) and the other substituents are each independently selected from a fluorine atom or a perfluorinated alkyl chain having from 1 to 3 carbon atoms.

4. The block copolymer (P) according to claim 1, wherein in formula (III):

t is 0; or t is 1 and $R_{10}$ complies with one of the following formulae:

$$—(CF_2)_d(O)_e(CF_2O)_fR_{CF}(O)_{e*}(CF_2)_{d*}(CF2O)_{f*} \quad (R_{10\text{-}i})$$

wherein each of d, d*, e, e*, f and f* is independently zero or 1 and $R_{CF}$ is a perfluoroalkyl chain comprising from 1 to 12, optionally interrupted by one or more oxygen atoms $$—O—(C_3F_6O)_h—(CF_2)_i—(OC_3F_6)_j—O— \quad (R_{10\text{-}ii})$$

wherein h=j and h+j is from 2 to 6, and i is from 2 to 6.

5. The block copolymer (P) according to claim 1, wherein in formula (III):

z is equal to 1 and $R_{10}$ is an oxygen atom or a bivalent perfluorinated alkyl chain comprising from 1 to 24 carbon atoms, optionally interrupted by and/or comprising at least one oxygen atom; and/or one of substituents $R_{11}$ and $R_{12}$ is a group of formula (IV) and the other substituent is selected from a fluorine atom or a perfluorinated alkyl chain having from 1 to 3 carbon atoms; and/or one of substituents $R_{13}$ to $R_{15}$ is a group of formula (IV) and the other two substituents are independently selected from a fluorine atom or a perfluorinated alkyl chain having from 1 to 3 carbon atoms.

6. The block copolymer (P) according to claim 1, wherein in formula (IV):

a is 1, v is 1 and B^ is a group of formula $—[C(R^{1\wedge})(R^{2\wedge})—C(R^{3\wedge})(R^{4\wedge})]—$ wherein $R^{1\wedge}$ to $R^{4\wedge}$ each independently is selected from the group consisting of fluorine atom, perfluorinated linear or branched alkyl group having from 1 to 6 carbon atoms, or group of formula (III).

7. The block copolymer (P) according to claim 1, said copolymer (P) having a complex viscosity, measured at 0.1 rad/s and at 25° C. according to ISO 6721 part 10, from 10 Pa*s to 2000 Pa*s.

8. The block copolymer (P) according to claim 1, said copolymer (P) being free from pendant groups comprising moieties capable of undergoing a chemical reaction.

9. A mixture (P) comprising two or more block copolymers (P) as defined in claim 1.

10. A block copolymer (P) having two chain ends, wherein both said chain ends comprise a perfluorinated alkyl group, and comprising a first and a second (per)fluoropolyether chain [PFPE chain] each having two chain ends, wherein the first chain end of said first and second PFPE chain comprises a perfluorinated alkyl group and the second chain end of said first and second PFPE chain are bonded to each other via a block of formula (I):

$$—[A—B]— \quad (I)$$

wherein (A) is a PFPE chain, and (B) is a moiety complying with the following formula (II):

(II)

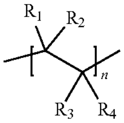

wherein n is an integer from 1 to 3;

$R_1$ to $R_4$, each independently, is selected from the group consisting of, fluorine atom, perfluorinated linear or branched alkyl group having from 1 to 6 carbon atoms, group of formula (III):

$$—(R_{10})_t[C(R_{11})(R_{12})—C(R_{13})(R_{14})(R_{15})]_z \quad (III)$$

wherein $R_{10}$ is an oxygen atom, or a bi-/tri-/tetravalent perfluorinated alkyl chain comprising from 1 to 24 carbon atoms, optionally interrupted by and/or comprising at least one oxygen atom, t is 0; or t is 1 and $R_{10}$ complies with one of the following formulae:

$$—(CF_2)_d(O)_e(CF_2O)_fR_{CF}(O)_{e*}(CF_2)_{d*}(CF2O)_{f*} \quad (R_{10\text{-}i})$$

wherein each of d, d*, e, e*, f and f* is independently zero or 1 and $R_{CF}$ is a perfluoroalkyl chain comprising from 1 to 12, optionally interrupted by one or more oxygen atoms $$—O—(C_3F_6O)_h—(CF_2)_i—(OC_3F_6)_j—O— \quad (R_{10\text{-}ii})$$

wherein h=j and h+j is from 2 to 6, and i is from 2 to 6;

z is an integer from 1 to 3;

$R_{11}$ to $R_{15}$, each independently, is selected from the group consisting of, fluorine atom, perfluorinated linear or branched alkyl group having from 1 to 6 carbon atoms and group of formula (IV):

$$—[(A^\wedge)_a—(B^\wedge)_v]—(C^\wedge)—T \quad (IV)$$

wherein $A^\wedge$ is a PFPE chain, a is zero or 1, v is zero or an integer from 1 to 3, $B^\wedge$ is a group of formula $—[C(R^{1\wedge})(R^{2\wedge})—C(R^{3\wedge})(R^{4\wedge})]—$ wherein $R^{1\wedge}$ to $R^{4\wedge}$ each independently has the meaning defined above for $R_1$ to $R_4$, $C^\wedge$ is a PFPE chain, and T is a perfluorinated alkyl group;

wherein:

said A and B in formula (I) and said $A^\wedge$ and $B^\wedge$ in formula (IV) are statistically distributed, at least one of $R_1$ to $R_4$ is a group of formula (III), one of $R_{11}$ or $R_{12}$ and one of $R_{13}$ to $R_{15}$, is a group of formula (IV) wherein a is 1, and the sum of $(B+B^\wedge)$ is from 1 to 15.

* * * * *